United States Patent
Li

(10) Patent No.: US 10,860,453 B2
(45) Date of Patent: Dec. 8, 2020

(54) INDEX ANOMALY DETECTION METHOD AND APPARATUS, AND ELECTRONIC DEVICE

(71) Applicant: Advanced New Technologies Co. Ltd., Grand Cayman (KY)

(72) Inventor: Longfei Li, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/749,772

(22) Filed: Jan. 22, 2020

(65) Prior Publication Data

US 2020/0159637 A1 May 21, 2020

Related U.S. Application Data

(63) Continuation of application No. PCT/CN2018/097338, filed on Jul. 27, 2018.

(30) Foreign Application Priority Data

Jul. 28, 2017 (CN) .......................... 2017 1 0629717

(51) Int. Cl.
*G06F 11/00* (2006.01)
*G06F 11/34* (2006.01)
(Continued)

(52) U.S. Cl.
CPC .............. *G06F 11/34* (2013.01); *G06F 7/556* (2013.01); *G06F 17/18* (2013.01); *G06N 7/005* (2013.01)

(58) Field of Classification Search
CPC .. G06F 11/34; G06F 11/3447; G06F 11/3452; G06F 7/556; G06F 17/18; G06N 7/005
See application file for complete search history.

(56) References Cited

U.S. PATENT DOCUMENTS

2004/0078171 A1* 4/2004 Wegerich ........... G06K 9/00536
702/188
2010/0083055 A1* 4/2010 Ozonat ............... G06F 11/3419
714/47.2
(Continued)

FOREIGN PATENT DOCUMENTS

CN 101645884 A 2/2010
CN 102937930 A 2/2013
(Continued)

OTHER PUBLICATIONS

International Search Report for International Application No. PCT/CN2018/097338, dated Oct. 22, 2018.
(Continued)

*Primary Examiner* — Philip Guyton
(74) *Attorney, Agent, or Firm* — Finnegan, Henderson, Farabow, Garrett & Dunner, L.L.P.

(57) ABSTRACT

An index anomaly detection method includes: acquiring data of each of monitoring points, contained in a period of time, of a monitored index; extracting a mean value and a variance of the data of the monitoring points using a Gaussian model; calculating, according to the mean value and the variance of the data of the monitoring points, probabilities of occurrence of the data of the monitoring points, respectively; calculating, according to the respectively calculated probabilities, joint probabilities of occurrence of the data of the monitoring points contained in respective windows divided from the period of time; and detecting, according to the joint probabilities corresponding to the respective windows, whether the monitored index is abnormal.

15 Claims, 6 Drawing Sheets

(51) Int. Cl.
*G06F 7/556* (2006.01)
*G06F 17/18* (2006.01)
*G06N 7/00* (2006.01)

(56) References Cited

U.S. PATENT DOCUMENTS

| | | |
|---|---|---|
| 2015/0269050 A1 | 9/2015 | Filimonov et al. |
| 2016/0062950 A1* | 3/2016 | Brodersen ............... G06K 9/00 |
| | | 702/181 |
| 2016/0147583 A1* | 5/2016 | Ben Simhon ......... G06F 11/076 |
| | | 714/47.3 |
| 2016/0217022 A1* | 7/2016 | Velipasaoglu ........ G06F 11/079 |
| 2016/0246662 A1* | 8/2016 | Meng .................... G06F 11/079 |
| 2017/0195240 A1* | 7/2017 | Chen ....................... H04L 43/16 |
| 2018/0248905 A1* | 8/2018 | Cote ....................... G06K 9/627 |
| 2019/0102276 A1* | 4/2019 | Dang .................. H04L 67/1097 |
| 2019/0334759 A1* | 10/2019 | Ray ...................... H04L 41/064 |

FOREIGN PATENT DOCUMENTS

| | | |
|---|---|---|
| CN | 102957579 A | 3/2013 |
| CN | 103218628 A | 7/2013 |
| CN | 103974311 A | 8/2014 |
| CN | 104348810 A | 2/2015 |
| JP | H0354638 A | 3/1991 |

OTHER PUBLICATIONS

Extended European Search Report for European Application No. 18838643.7, dated May 4, 2020.
Zhijun Fang et al., *Stock Fluctuations Anomaly Detection Based on Wavelet Modulus Maxima*, International Conference on Business Intelligence and Financial Engineering, IEEE, Piscataway, NJ, USa, Jul. 24, 2009, pp. 360-363.

* cited by examiner

600

INDEX ANOMALY DETECTION METHOD AND APPARATUS, AND ELECTRONIC DEVICE

CROSS-REFERENCE TO RELATED APPLICATIONS

This application is a continuation application of International Application No. PCT/CN2018/097338, filed on Jul. 27, 2018, which is based upon and claims priority to Chinese Patent Application No. 201710629717.6, filed on Jul. 28, 2017, the entire content of all of which is incorporated herein by reference.

TECHNICAL FIELD

The specification relates to the technical field of computer software, and in particular to an index anomaly detection method and apparatus, and an electronic device.

TECHNICAL BACKGROUND

With the rapid development of computer and Internet technologies, many transactions can be carried out online, which brings convenience to users and also puts forward higher requirements for the reliability of various corresponding transaction systems.

In general, some important indexes in a transaction system can be monitored. By taking a third-party payment system as an example, the monitored indexes can be, for example, the number of payment account theft events triggered per minute, the payment request delay per minute, etc. Further, anomaly detection may be performed on the monitored indexes based on the monitoring data, and if an anomaly is detected, it can be processed by an operator or research and development personnel in a timely manner, so as to ensure the reliability of the transaction system.

In the prior art, a historical mean value and a variance of a monitored index, as well as jitter, are typically used for anomaly detection for a single monitoring point.

Based on the prior art, there is a need for a more accurate index anomaly detection scheme.

SUMMARY

Embodiments of the specification provide an index anomaly detection method and apparatus and an electronic device for solving the technical problem that there is a need for a more accurate index anomaly detection scheme.

In an embodiment, an index anomaly detection method includes: acquiring data of each of monitoring points, contained in a period of time, of a monitored index; extracting a mean value and a variance of the data of the monitoring points using a Gaussian model; calculating, according to the mean value and the variance of the data of the monitoring points, probabilities of occurrence of the data of the monitoring points, respectively; calculating, according to the respectively calculated probabilities, joint probabilities of occurrence of the data of the monitoring points contained in respective windows divided from the period of time; and detecting, according to the joint probabilities corresponding to the respective windows, whether the monitored index is abnormal.

In an embodiment, an index anomaly detection apparatus includes: an acquisition module for acquiring data of each of monitoring points, contained in a period of time, of a monitored index; an extraction module for extracting a mean value and a variance of the data of the monitoring points using a Gaussian model; a first calculation module for calculating, according to the mean value and the variance of the data of the monitoring points, probabilities of occurrence of the data of the monitoring points, respectively; a second calculation module for calculating, according to the respectively calculated probabilities, joint probabilities of occurrence of the data of the monitoring points contained in respective windows divided from the period of time; and a detection module for detecting, according to the joint probabilities corresponding to the respective windows, whether the monitored index is abnormal.

In an embodiment, an electronic device includes: a processor; and a memory storing instructions executable by the processor, wherein the processor is configured to perform: acquiring data of each of monitoring points, contained in a period of time, of a monitored index; extracting a mean value and a variance of the data of the monitoring points using a Gaussian model; calculating, according to the mean value and the variance of the data of the monitoring points, probabilities of occurrence of the data of the monitoring points, respectively; calculating, according to the respectively calculated probabilities, joint probabilities of occurrence of the data of the monitoring points contained in respective windows divided from the period of time; and detecting, according to the joint probabilities corresponding to the respective windows, whether the monitored index is abnormal.

In an embodiment, a non-transitory computer-readable storage medium has stored therein instructions that, when executed by a processor of a device, cause the device to perform the above described method.

At least one of the above-mentioned technical solutions used in the embodiments of the specification can achieve the following beneficial effects: since anomaly detection is performed on an index based on a Gaussian model and a window containing multiple monitoring points of the index, it is beneficial to preventing the jitter of a single monitoring point from misleading anomaly detection, thereby facilitating more accurate index anomaly detection.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION OF EMBODIMENTS

Embodiments of the specification provide an index anomaly detection method and apparatus, and an electronic device.

Embodiments of the specification will be described below with reference to the accompanying drawings. The described embodiments are merely examples rather than all of the embodiments consistent with the specification. All the other embodiments obtained by those of ordinary skill in the art based on the example embodiments of the specification without any creative effort should fall within the protection scope of the present application.

Figure 1A:
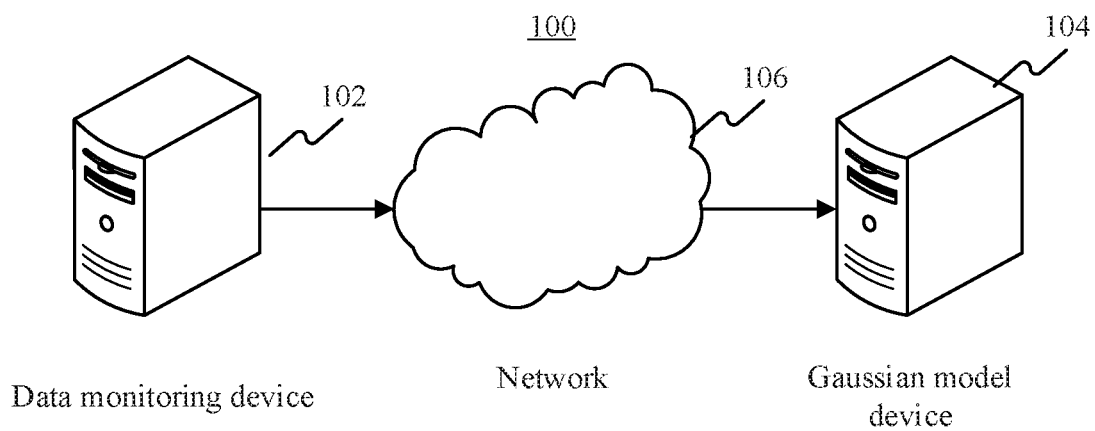
FIG. 1A and FIG. 1B are schematic diagrams of an index anomaly detection system according to an embodiment.
Figure 1B:
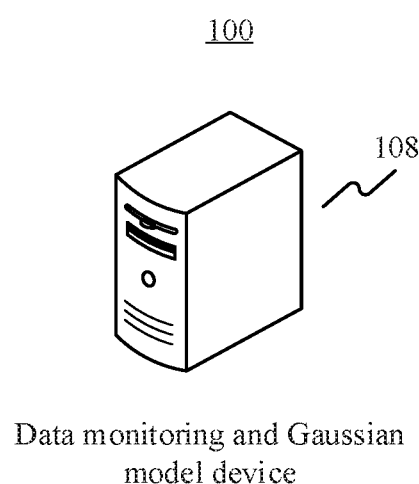

FIGS. 1A and 1B are schematic diagrams of an index anomaly detection system 100 according an embodiment. In an overall architecture shown in FIG. 1A, the system 100 includes a data monitoring device 102 and a Gaussian model device 104. The data monitoring device 102 sends monitoring data of a monitored index to the Gaussian model device 104 through a network 106. The Gaussian model device 104 is configured to process the monitoring data based on a window and a Gaussian model, and perform index anomaly detection according to a processing result. In an overall architecture shown in FIG. 1B, the monitoring data and the Gaussian model may be implemented on a same device 108, as the system 100.

Based on the above-described overall architectures, the solution of the specification will be described in detail below.

Figure 2:
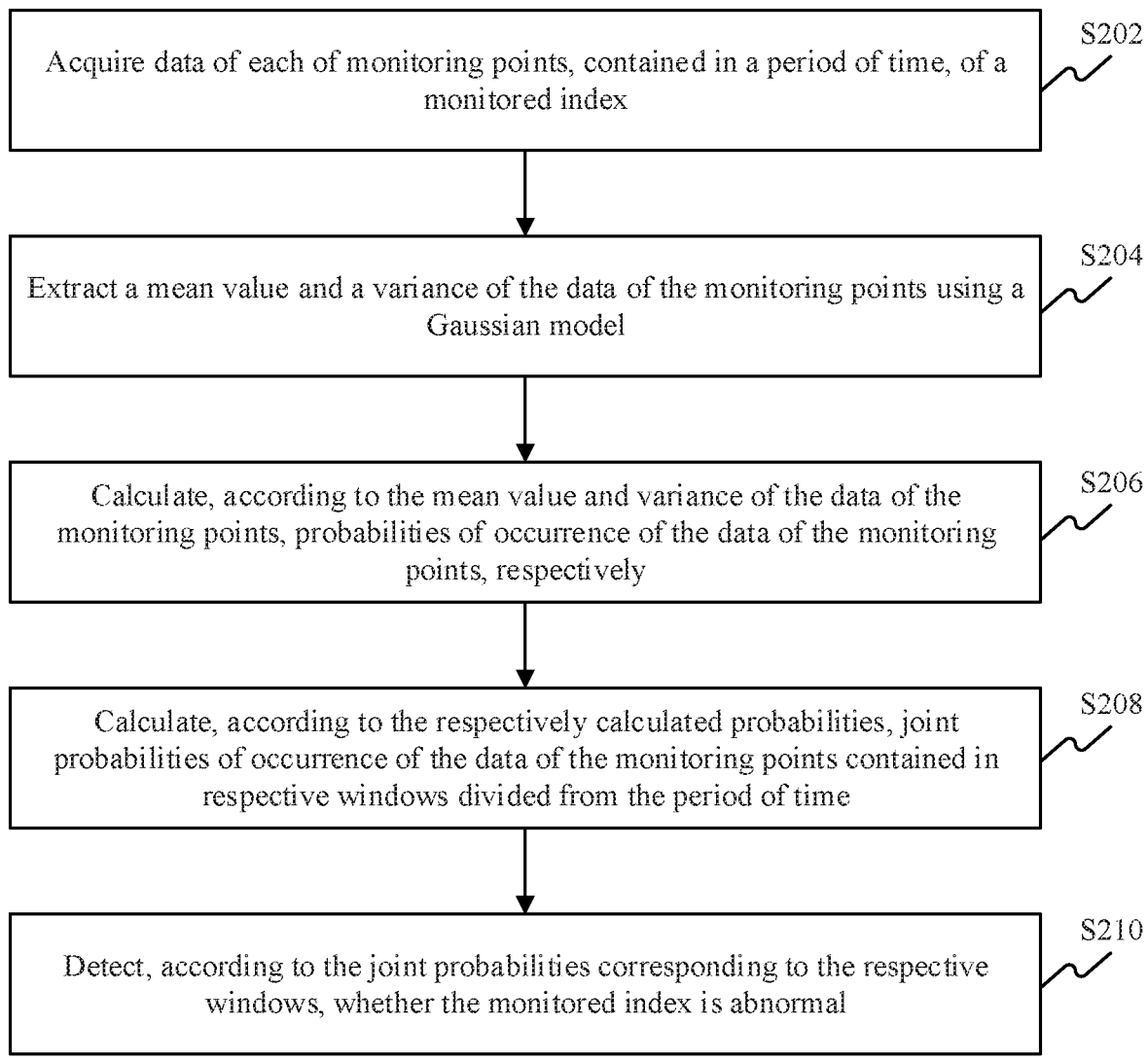
FIG. 2 is a flow chart of an index anomaly detection method according to an embodiment.

FIG. 2 is a flow chart of an index anomaly detection method 200 according to an embodiment. The method 200 may be performed for each of one or more monitored indexes by a devices that can act as a server or a terminal, such as a mobile phone, a tablet, a smart wearable device, a car machine, a personal computer, a medium-scale computer, a computer cluster, etc. Referring to FIG. 2, the method 200 may include the following steps.

In step S202, data of each of monitoring points, contained in a period of time, of a monitored index is acquired.

In the embodiments of the specification, a plurality of monitoring points may be contained in a period of time.

The number of payment account theft events triggered per minute is taken as an example of the monitored index. Assuming that the period of time is the latest day, and the first minute of each hour is a monitoring point, then 24 monitoring points can be contained in the period of time. Assuming that the period of time is the latest hour, and each minute is a monitoring point, then 60 monitoring points can be contained in the period of time.

Additionally, in practical applications, the monitoring points are not necessarily uniformly distributed, for example, may be relatively dense in daytime while relatively sparse in midnight.

In the embodiments of the specification, data of the monitored index at the monitoring point may refer to original monitoring data of the monitored index, that is, a value of the monitored index acquired at the monitoring point. For example, assuming that the values of the monitored index, which is the number of payment account theft events, acquired at three monitoring points contained in a period of time are 2, 8 and 1, respectively, then 2, 8 and 1 can be used as the data of the corresponding monitoring points. The data of the monitored index at the monitoring point may also refer to data obtained by performing particular processing on the original monitoring data, wherein the particular processing may be for the sake of more effectively implementing the solution of the specification.

For example, the particular processing may be logarithm taking processing. By the logarithm taking processing, the original monitoring data can be transformed into a smaller change, which facilitates reducing the adverse influence caused by the jitter of a single monitoring point to the index anomaly detection. For example, the logarithm of 2, 8, and 1 described above may be taken and then used as data of the corresponding monitoring points.

For another example, the particular processing may be homogenization processing, in which some data can be removed from or added to the original monitoring data, so that the data obtained by the processing is more uniform than the original monitoring data before the processing.

In step S204, a mean value and a variance of the data of the monitoring points are extracted using a Gaussian model.

In the embodiments of the specification, it can be assumed that the data corresponding to each monitoring point follows the Gaussian distribution, and a mean value and a variance of the data of the monitoring points are extracted using the Gaussian model. For example, estimation may be performed on the data of the monitoring points using the Gaussian model, and then the mean value and the variance of the data of the monitoring points are obtained according to the Gaussian model after the estimation. The Gaussian model may specifically comprise a Gaussian mixture model.

In step S206, probabilities of occurrence of the data of the monitoring points are respectively calculated according to the mean value and the variance of the data of the monitoring points.

In the embodiments of the specification, using the mean value and the variance of the data of the monitoring points as well as the Gaussian model used to extract the mean value and the variance of the data of the monitoring points, the probability of occurrence of the data corresponding to each of the monitoring points can be calculated.

In step S208, according to the respectively calculated probabilities, joint probabilities of occurrence of data of the monitoring points contained in respective windows divided from the period of time are calculated.

In the embodiments of the specification, index anomaly detection may not be performed for a single monitoring point, and index anomaly detection may instead be performed for a window containing multiple monitoring points. For example, a plurality of windows may be divided for a period of time in step S202. For a divided window, various monitoring points contained in the window are regarded as a whole, and then whether the monitored index is abnormal is detected by taking the whole as a unit.

In the embodiments of the specification, based on the respectively calculated probabilities of occurrence of the data corresponding to the monitoring points, a joint probability of occurrence of the data corresponding to the monitoring points within the divided window can be further calculated, wherein the joint probability may reflect the level of the monitored index in the corresponding window relative to that in other windows.

In step S210, whether the monitored index is abnormal is detected according to the joint probabilities corresponding to the respective windows.

In the embodiment, according to the joint probability corresponding to each of the windows, the probability of occurrence of the joint probability corresponding to each of the windows can be further calculated to serve as a basis for the anomaly detection of the monitored index.

In the method 200, since anomaly detection is performed on an index based on a Gaussian model and a window containing multiple monitoring points of the index, it is beneficial to preventing the jitter of a single monitoring point from misleading anomaly detection, thereby facilitating more accurate index anomaly detection.

Based on the method 200, the embodiments of the specification further provide some particular implementations and extended solutions of the method, which will be described below.

In the embodiments of the specification, assuming that logarithm taking processing is performed on the original monitoring data in advance to obtain data of the monitored index at the corresponding monitoring point, then for step S202, before acquiring monitoring data of the monitored index within a period of time, the following can be executed: acquiring original monitoring data of each monitoring point, contained in a period of time, of the monitored index; and taking logarithm of the original monitoring data, and using same as data of each monitoring point, contained in the period of time, of the monitored index, for use in the index anomaly detection.

In the embodiments of the specification, windows may be first divided, and then the corresponding joint probabilities are respectively calculated, or the windows may be divided while the joint probabilities corresponding to the currently divided windows are calculated.

In an embodiment, the windows are first divided, and then the corresponding joint probabilities are respectively calculated. For step S208, calculating, according to the respectively calculated probabilities, joint probabilities of occurrence of the data of the monitoring points contained in respective windows divided from the period of time may comprise: determining a plurality of different windows divided from the period of time; and respectively for each window and according to a probability, in the respectively calculated probabilities, corresponding to data of each of the monitoring points contained in the window, calculating a joint probability of occurrence of data of the monitoring points contained in the window.

In an embodiment, the plurality of different windows may completely cover the period of time.

In the embodiments of the specification, there are various ways for window division. For example, the windows can be divided according to a set time interval, or the windows can be divided according to transaction characteristics (for example, account levels, regions, etc.).

Dividing the windows according to a set time interval is taken as an example. Dividing a plurality of different windows from the period of time may, for example, comprise: dividing a plurality of different windows from the period of time according to a set time interval and a window length, wherein a difference between starting times of adjacent windows is the time interval.

For example, assuming that the period of time is 1000 minutes, the set time interval is 5 minutes, and the window length is 10 minutes, then the 1st to 10th minutes are divided into one window, the 5th to 15th minutes are divided into one window, the 10th to 20th minutes are divided into one window, the 15th to 25th minutes are divided into one window, and so on. 199 windows can be divided. In this example, adjacent windows are overlapped, which is not necessary in practical applications, and the time interval and the window length may not be fixed either.

In the embodiments of the specification, for step S210, detecting, according to the joint probabilities corresponding to the respective windows, whether the monitored index is abnormal may comprise: using the Gaussian model for the joint probability corresponding to each of the windows to extract a mean value and a variance of the joint probabilities; calculating, according to the mean value and the variance of the joint probabilities, a probability of occurrence of the joint probability corresponding to each of the windows, respectively; and detecting, according to the probability of occurrence of the joint probability corresponding to the window, whether the monitored index is abnormal.

It can be seen that the Gaussian model can be used again here, which is used for windows, whereas the Gaussian model used in step S204 is for monitoring points.

In the embodiments of the specification, according to the magnitude of the probability of occurrence of the joint probability, whether the monitored index is abnormal within the window corresponding to the joint probability can be detected.

For example, detecting, according to the probability of occurrence of the joint probability corresponding to the window, whether the monitored index is abnormal may comprise: detecting, according to the mean value and the variance of the joint probabilities and according to the probability of occurrence of the joint probability corresponding to the window, whether the monitored index is abnormal within the window according to the 3σ rule.

In the embodiment, according to the 3σ rule, if the probability of occurrence of the joint probability is deviated from the mean value of the joint probabilities by plus or minus 3 standard deviations (the standard deviation is an arithmetic square root of the variance of the above calculated joint probabilities), it can be determined that the corresponding monitored index is abnormal within the corresponding window.

It should be noted that, in practical applications, a threshold value of the joint probability and/or a threshold value of the probability of occurrence of the joint probability may also be set to detect windows with an anomaly, while the 3σ rule does not necessarily need to be used.

After a window with an anomaly is detected, specific measures can also be taken to further analyze which monitoring points in the window mainly cause the anomaly, thus facilitating more precisely and effectively solving related transaction system problems later.

Figure 3:
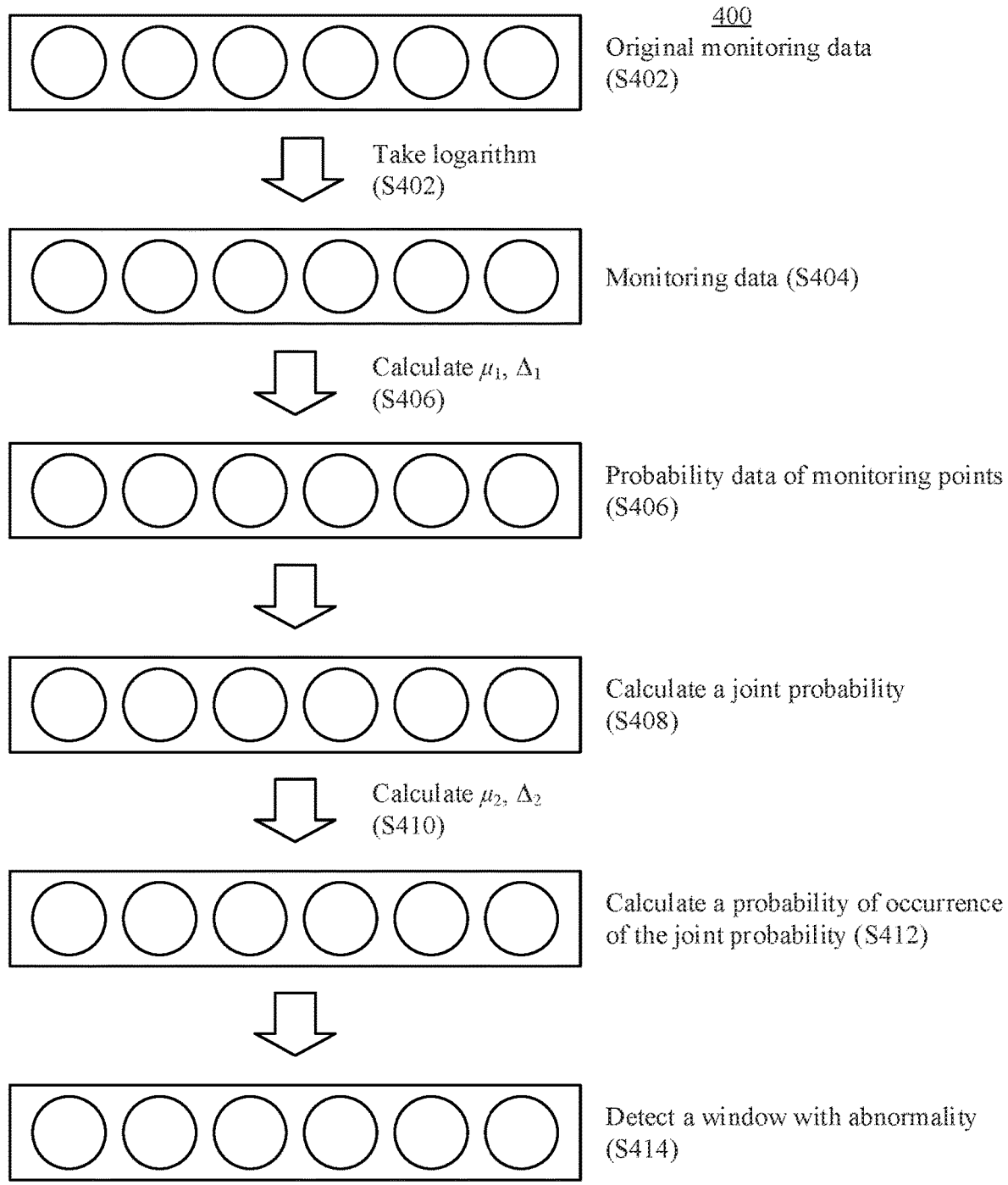
FIG. 3 is a schematic diagram of an index anomaly detection method according to an embodiment.
Figure 4:
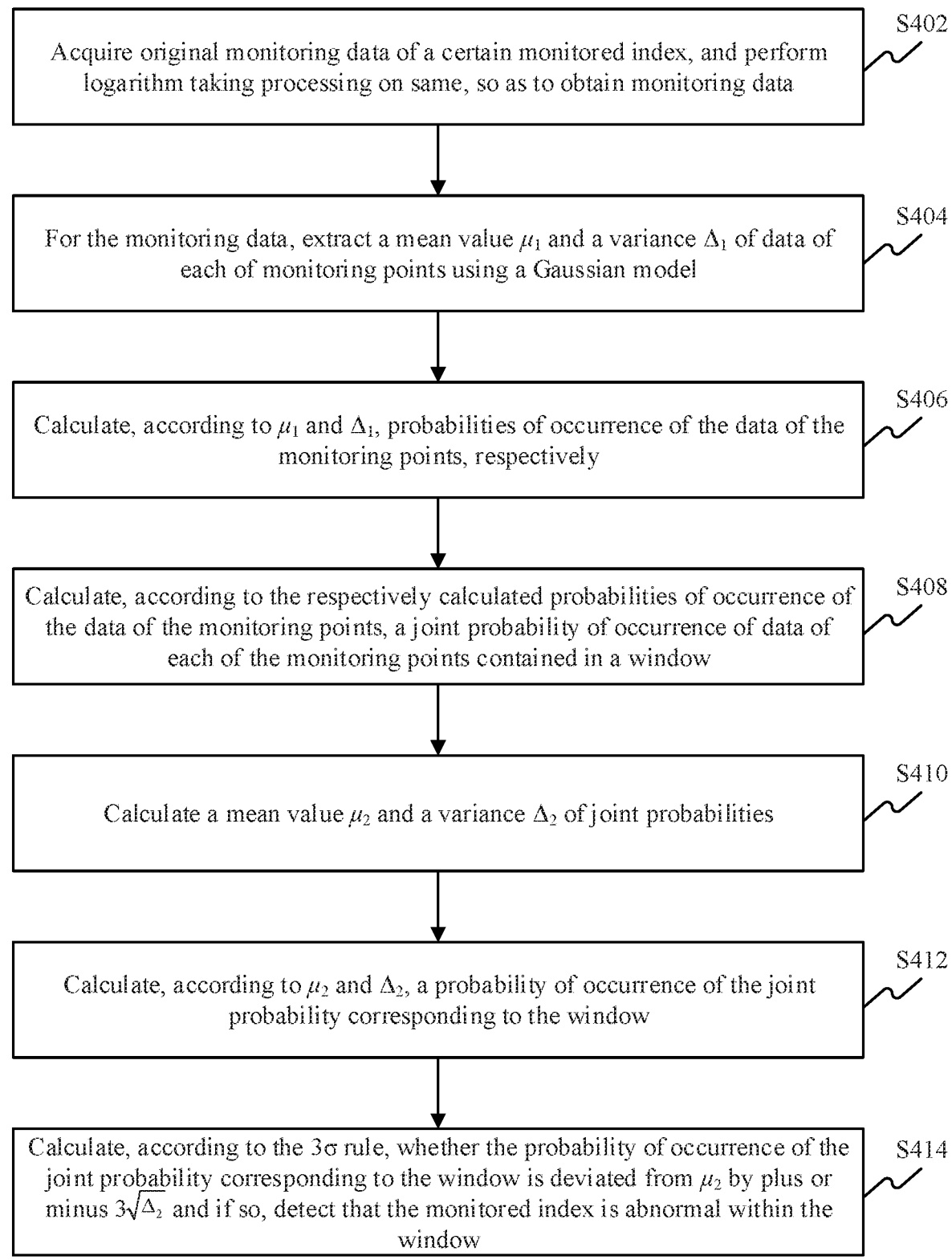
FIG. 4 is a flow chart of an index anomaly detection method according to an embodiment.

FIG. 3 is a schematic diagram of an index anomaly detection method 400 according to an embodiment. FIG. 4 is a flow chart of the method 400, according to an embodiment.

The blocks in FIG. 3 represent a current window, and the circles in the blocks represent monitoring points. Referring to FIG. 3 and FIG. 4, the method 400 may include the following steps.

S402: acquiring original monitoring data of a certain monitored index, and performing logarithm taking processing on same, so as to obtain monitoring data;

S404: for the monitoring data, extracting a mean value $\mu_1$ and a variance $\Delta_1$ of data of each of monitoring points using a Gaussian model;

S406: calculating, according to $\mu_1$ and $\Delta_1$ probabilities of occurrence of the data of the monitoring points, respectively;

S408: calculating, according to the respectively calculated probabilities of occurrence of the data of the monitoring points, a joint probability of occurrence of the data of each of the monitoring points contained in a window;

S410: calculating a mean value $\mu_2$, and a variance $\Delta_2$ of joint probabilities;

S412: calculating, according to $\mu_2$ and $\Delta_2$, a probability of occurrence of the joint probability corresponding to the window; and

S414: calculating, according to the 3σ rule, whether the probability of occurrence of the joint probability corresponding to the window is deviated from $\mu_2$ by plus or minus $3\sqrt{\Delta_2}$, and if so, detecting that the monitored index is abnormal within the window.

For example, the probability p(X) of occurrence of the joint probability corresponding to the current window can be calculated using the following formula:

$$p(X) = p\left\{\prod_{i=1}^{k} p(x_i|\mu_1, \sigma_1)|\mu_2, \sigma_2\right\};\quad \text{(Formula I)}$$

where $\sigma_1$ represents an arithmetic square root of $\Delta_1$; $\sigma_2$ represents an arithmetic square root of $\Delta_2$; k represents the number of monitoring points contained in the current window; $p(x_i|\mu_i, \sigma_i)$ represents the probability of occurrence of data of an i th monitoring point contained in the current window; and $$\prod_{i=1}^{k} p(x_i|\mu_1, \sigma_1)$$

represents a joint probability of occurrence of data of k monitoring points contained in the current window.

If p(X) is deviated from $\mu_2$ by plus or minus $3\sigma_2$, it can be determined that the monitored index is abnormal within the current window.

The number of payment account theft events triggered per minute is still taken as an example of the monitored index. Every 6 minutes in a period of time is divided into one window, and each window contains 6 monitoring points, as shown in FIG. 3.

Assuming that the original monitoring data corresponding to the monitoring points in the current window are: 2, 8, 1, 20, 1 and 1, respectively, and logarithm taking (assuming the use of natural logarithm) processing is performed on the original monitoring data in the current window, so as to obtain data of each monitored point, contained in the current window, of the monitored index, which are: ln2, ln8, 0, ln20, 0 and 0, respectively.

Similarly, the data of the monitoring points, contained in the period of time, of the monitored index can be obtained by means of logarithm taking processing. In turn, the mean value and the variance of the data of the monitoring points can be extracted using the Gaussian model, the probability of occurrence of the joint probability corresponding to the current window can be calculated using Formula I above, and whether the monitored index is abnormal within the current window is detected according to the $3\sigma$ rule. According to this solution, whether the monitored index is abnormal may be checked within any of the windows divided from the period of time, respectively.

By means of the window and Gaussian model-based index anomaly detection solution, false positives are reduced, and the accuracy of detection results is improved.

Figure 5:
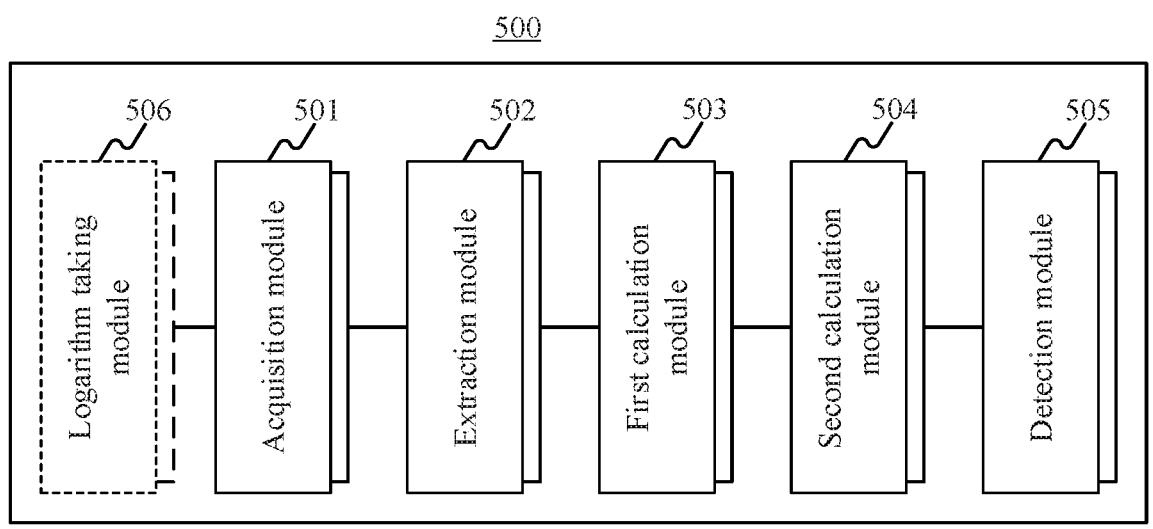
FIG. 5 is a schematic diagram of an index anomaly detection apparatus according to an embodiment.

FIG. 5 is a schematic diagram of an index anomaly detection apparatus 500, according to an embodiment. The apparatus 500 corresponds to the method 200 (FIG. 2), and the dotted-line block in FIG. 5 represents an optional module.

The apparatus 500 may be located on the execution subject for the method 200 (FIG. 2), and comprises: an acquisition module 501 for acquiring data of each of monitoring points, contained in a period of time, of a monitored index, wherein a plurality of monitoring points are contained within the period of time; an extraction module 502 for extracting a mean value and a variance of the data of the monitoring points using a Gaussian model; a first calculation module 503 for calculating, according to the mean value and the variance of the data of the monitoring points, probabilities of occurrence of the data of the monitoring points, respectively; a second calculation module 504 for calculating, according to the respectively calculated probabilities, joint probabilities of occurrence of the data of the monitoring points contained in respective windows divided from the period of time; and a detection module 505 for detecting, according to the joint probabilities corresponding to the respective windows, whether the monitored index is abnormal.

In an embodiment, the apparatus 500 further comprises: a logarithm taking module 506 for acquiring, before the acquisition module 501 acquires data of each of monitoring points, contained in a period of time, of a monitored index, original monitoring data of each monitoring point, contained in a period of time, of the monitored index, and taking logarithm of the original monitoring data and using same as data of each monitoring point, contained in the period of time, of the monitored index, for use in the index anomaly detection.

In an embodiment, the second calculation module 504 calculating, according to the respectively calculated probabilities, joint probabilities of occurrence of the data of the monitoring points contained in respective windows divided from the period of time comprises: the second calculation module 504 determining a plurality of different windows divided from the period of time; and respectively for each window and according to a probability, in the respectively calculated probabilities, corresponding to data of each of the monitoring points contained in the window, calculating a joint probability of occurrence of data of each of the monitoring points contained in the window.

In an embodiment, dividing a plurality of different windows from the period of time comprises: dividing a plurality of different windows from the period of time according to a set time interval and a window length, wherein a difference between starting times of adjacent windows is the time interval.

In an embodiment, the detection module 505 detecting, according to the joint probabilities corresponding to the respective windows, whether the monitored index is abnormal comprises: the detection module 505 using the Gaussian model for the joint probability corresponding to each of the windows to extract a mean value and a variance of the joint probabilities; calculating, according to the mean value and the variance of the joint probabilities, a probability of occurrence of the joint probability corresponding to each of the windows, respectively; and detecting, according to the probability of occurrence of the joint probability corresponding to the window, whether the monitored index is abnormal.

In an embodiment, the detection module 505 detecting, according to the probability of occurrence of the joint probability corresponding to the window, whether the monitored index is abnormal comprises: the detection module 505 detecting, according to the mean value and the variance of the joint probabilities and according to the probability of occurrence of the joint probability corresponding to the window, whether the monitored index is abnormal within the window according to the $3\sigma$ rule.

In an embodiment, the Gaussian model comprises a Gaussian mixture model.

Figure 6:
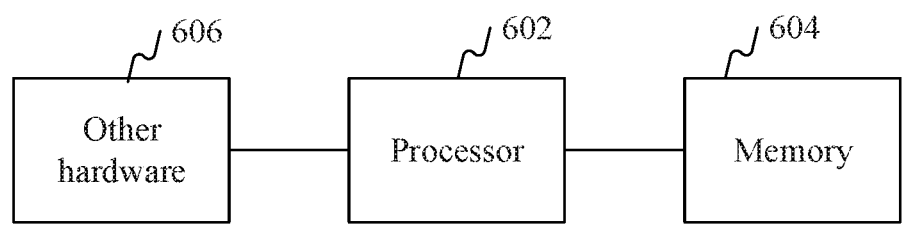
FIG. 6 is a schematic diagram of an electronic device according to an embodiment.

FIG. 6 is a schematic diagram of an electronic device 600, according to an embodiment. The device 600 may be a server or a terminal, such as a mobile phone, a tablet computer, a smart wearable device, an on-board computer, a personal computer, a medium computer, a computer cluster, and the like. The device 600 may include a processor 602, a memory 604, and other hardware 606, such as a chip for transmitting and receiving wireless signals, a board card for implementing a network communication interface, an input/output interface, etc.

The processor 602 may include one or more dedicated processing units, application-specific integrated circuits (ASICs), field-programmable gate arrays (FPGAs), or various other types of processors or processing units. The processor 602 is coupled with the memory 604 and is configured to execute instructions stored in the memory 604 to perform the above described methods.

The memory 604 may include a permanent memory, a non-permanent memory, a random access memory (RAM) and/or a non-volatile memory (such as a read-only memory (ROM) or a flash memory (flash RAM)), etc. The memory 604 stores an instruction executable by the processor 602, and when executed by the processor 602, the instruction causes the device 600 to: acquire data of each of monitoring points, contained in a period of time, of a monitored index; extract a mean value and a variance of the data of the monitoring points using a Gaussian model; calculate, according to the mean value and the variance of the data of the monitoring points, probabilities of occurrence of the data of the monitoring points, respectively; calculate, according to the respectively calculated probabilities, joint probabilities of occurrence of the data of the monitoring points contained in respective windows divided from the period of time; and detect, according to the joint probabilities corresponding to the respective windows, whether the monitored index is abnormal.

Embodiments of the specification further provide a non-transitory computer-readable storage medium having stored thereon instructions that, when executed by a device, cause the device to: acquire data of each of monitoring points, contained in a period of time, of a monitored index; extract a mean value and a variance of the data of the monitoring point using a Gaussian model; calculate, according to the mean value and the variance of the data of the monitoring points, probabilities of occurrence of the data of the monitoring points, respectively; calculate, according to the respectively calculated probabilities, joint probabilities of occurrence of the data of the monitoring points contained in respective windows divided from the period of time; and detect, according to the joint probabilities corresponding to the respective windows, whether the monitored index is abnormal.

Specific embodiments of the specification are described above. Other embodiments fall within the scope of the appended claims. In some cases, the actions or steps specified in the claims can be performed in a different order than those in the embodiments and can still achieve desired results. Additionally, the processes depicted in the drawings are not necessarily in a particular order or consecutive order as shown to achieve the desired results. In some implementations, multi-task processing and parallel processing are also possible or may be advantageous.

Various embodiments in the description are all described in a progressive manner. For the same or similar parts among the embodiments, reference can be made to one another. For each embodiment, the part thereof different from the other embodiments is mainly described. Particularly, the apparatus, electronic device, non-transitory computer-readable storage medium embodiments are described in a relatively simple manner because they are substantially similar to the method embodiments, and for related parts, reference can be made to the parts of the description in the method embodiments.

The apparatus, electronic device and non-transitory computer storage medium provided in the embodiments of the specification correspond to the method. Therefore, the apparatus, electronic device and non-transitory computer storage medium also have the similar beneficial technical effects to those of the corresponding method. Since the beneficial technical effects of the method have been described in detail above, the beneficial technical effects of the corresponding apparatus, electronic device and non-transitory computer storage medium will not be described herein.

Each of the above described methods and modules may be implemented as software, or hardware, or a combination of software and hardware. For example, a Programmable Logic Device (PLD) (for example, a Field Programmable Gate Array (FPGA)) is such an integrated circuit, and logic functions thereof are determined by a user programming the device. Designers program by themselves to integrate a digital system into a piece of PLD, without asking a chip manufacturer to design and manufacture a dedicated integrated circuit chip. Moreover, at present, the programming is mostly implemented by using logic compiler software, instead of manually manufacturing an integrated circuit chip. The logic compiler software is similar to a software compiler used for developing and writing a program, and original code before compiling also needs to be written in a specific programming language, which is referred to as a Hardware Description Language (HDL). There are many types of HDLs, such as ABEL (Advanced Boolean Expression Language), AHDL (Altera Hardware Description Language), Confluence. CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog are most commonly used now. Those skilled in the art also should know that a hardware circuit for implementing the logic method procedure may be easily obtained only by slightly logically programming the method procedure using the above-described several hardware description languages and programming same into an integrated circuit.

A controller may be implemented in any suitable manner in the above described devices. For example, the controller may be in the form of a microprocessor or a processor, and a computer-readable storage medium storing computer-readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PICl8F26K20, and Silicone Labs C8051F320. A memory controller may also be implemented as a part of a control logic of a memory. Those skilled in the art also know that, in addition to implementing the controller by pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein for implementing various functions may also be considered as structures inside the hardware component. Alternatively, the apparatuses for implementing various functions may even be considered as both software modules for implementing the method and structures inside the hardware components.

The system, apparatus, modules or units illustrated in the above-described embodiments can be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the above-described apparatus is divided into various modules based on functions, and the modules are described separately. In some embodiments, functions of various modules can be implemented in one or more pieces of software and/or hardware.

Those skilled in the art should understand that the embodiments of the specification may be provided as a method, a system, or a computer program product. Therefore, the embodiments of the specification may be implemented in a form of complete hardware embodiments, complete software embodiments, or embodiments combining software and hardware. Moreover, the embodiments of the specification may be in the form of a computer program product implemented on one or more computer usable storage media (including, but not limited to, a magnetic disk memory, a CD-ROM, an optical memory and the like) including computer usable program codes therein.

The specification is described with reference to flowcharts and/or block diagrams of the method, device (system) and computer program product according to the embodiments of the specification. It should be understood that computer program instructions may implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of other programmable data processing devices to produce a machine, so that an apparatus for implementing a specified function in one or more processes in the flowcharts and/or in one or more blocks in the block diagrams is produced by the instructions executed by the processor of the computer or other programmable data processing devices.

These computer program instructions may also be stored in a computer readable memory that can guide a computer or other programmable data processing devices to operate in a particular manner, such that the instructions stored in the computer readable memory produce a manufactured product including an instruction apparatus. The instruction apparatus implements a function specified in one or more processes in the flowcharts and/or in one or more blocks in the block diagrams.

These computer program instructions may also be loaded onto a computer or other programmable data processing devices, such that a series of operation steps are performed on the computer or other programmable devices, thus producing computer-implemented processing. Therefore, the instructions executed on the computer or other programmable devices provide steps for implementing a function specified in one or more processes in the flowcharts and/or in one or more blocks in the block diagrams.

The computer-readable storage medium includes persistent and non-persistent media as well as removable and non-removable media, and may store information by any method or technology. The information may be a computer-readable instruction, a data structure, a module of a program, or other data. Examples of the storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. The computer-readable medium does not include a computer-readable transitory medium, such as modulated data signals and carriers.

It should be further noted that terms "include," "comprise," or any other variations thereof are intended to cover non-exclusive inclusion, so that a process, method, article or device including a series of elements not only includes the elements, but also includes other elements not expressly listed, or further includes elements inherent to the process, method, article or device. In the absence of more limitations, an element defined by "including a/an . . . " does not exclude that the process, method, article or device including the element further has other identical elements.

The embodiments may be implemented with computer-executable instructions executed by a computer, for example, a program module. Generally, the program module includes a routine, a program, an object, a component, a data structure, and the like for executing a specific task or implementing a specific abstract data type. The embodiments may also be implemented in distributed computing environments. In the distributed computing environments, a task is executed by a remote processing device connected through a communications network. In the distributed computing environments, the program module may be located in local and remote computer storage media, including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. An index anomaly detection method, comprising:
acquiring, by at least one computer device connected to a network, data of each of monitoring points, contained in a period of time, of a monitored index, wherein the monitored index corresponds to at least one of payment account theft events or payment request delay in a transaction system;
extracting, by the at least one computer device, a mean value and a variance of the data of the monitoring points using a Gaussian model;
calculating by the at least one computer device, according to the mean value and the variance of the data of the monitoring points, probabilities of occurrence of the data of the monitoring points, respectively;

calculating by the at least one computer device, according to the respectively calculated probabilities, joint probabilities of occurrence of the data of the monitoring points contained in respective windows divided from the period of time; and detecting by the at least one computer device, according to the joint probabilities corresponding to the respective windows, whether the monitored index is abnormal, and outputting a detection result when the monitored index is detected to be abnormal.

2. The method of claim 1, wherein before acquiring data of each of monitoring points, contained in a period of time, of a monitored index, the method further comprises:

acquiring original monitoring data of each monitoring point, contained in a period of time, of the monitored index; and taking a logarithm of the original monitoring data of each monitoring point and using the logarithm as data of each monitoring point, contained in the period of time, of the monitored index, for index anomaly detection.

3. The method of claim 1, wherein calculating, according to the respectively calculated probabilities, joint probabilities of occurrence of the data of the monitoring points contained in respective windows divided from the period of time comprises:

determining a plurality of different windows divided from the period of time; and respectively for each window and according to a probability, in the respectively calculated probabilities, corresponding to data of each of the monitoring points contained in a window, calculating a joint probability of occurrence of data of each of the monitoring points contained in the window.

4. The method of claim 3, wherein dividing a plurality of different windows from the period of time comprises:

dividing a plurality of different windows from the period of time according to a set time interval and a window length, wherein a difference between starting times of adjacent windows is the time interval.

5. The method of claim 1, wherein detecting, according to the joint probabilities corresponding to the respective windows, whether the monitored index is abnormal comprises:

using the Gaussian model for the joint probabilities to extract a mean value and a variance of the joint probabilities;

calculating, according to the mean value and the variance of the joint probabilities, a probability of occurrence of the joint probability corresponding to each of the windows, respectively; and detecting, according to the probability of occurrence of the joint probability corresponding to a window, whether the monitored index is abnormal.

6. The method of claim 5, wherein detecting, according to the probability of occurrence of the joint probability corresponding to the window, whether the monitored index is abnormal comprises:

detecting, according to the mean value and the variance of the joint probabilities and according to the probability of occurrence of the joint probability corresponding to the window, whether the monitored index is abnormal within the window according to a $3\sigma$ rule.

7. The method of claim 1, wherein the Gaussian model comprises a Gaussian mixture model.

8. An electronic device, comprising:
a processor; and
a memory storing instructions executable by the processor, wherein the processor is configured to perform:

acquiring data of each of monitoring points, contained in a period of time, of a monitored index, wherein the monitored index corresponds to at least one of payment account theft events or payment request delay in a transaction system;

extracting a mean value and a variance of the data of the monitoring points using a Gaussian model;

calculating, according to the mean value and the variance of the data of the monitoring points, probabilities of occurrence of the data of the monitoring points, respectively;

calculating, according to the respectively calculated probabilities, joint probabilities of occurrence of the data of the monitoring points contained in respective windows divided from the period of time; and detecting, according to the joint probabilities corresponding to the respective windows, whether the monitored index is abnormal, and outputting a detection result when the monitored index is detected to be abnormal.

9. The device of claim 8, wherein the processor is further configured to perform:

acquiring original monitoring data of each monitoring point, contained in the period of time, of the monitored index, and taking a logarithm of the original monitoring data of each monitoring point and using the logarithm as data of each monitoring point, contained in the period of time, of the monitored index, for index anomaly detection.

10. The device of claim 8, wherein the processor is further configured to perform:

determining a plurality of different windows divided from the period of time; and respectively for each window and according to a probability, in the respectively calculated probabilities, corresponding to data of each of the monitoring points contained in a window, calculating a joint probability of occurrence of data of each of the monitoring points contained in the window.

11. The device of claim 10, wherein dividing a plurality of different windows from the period of time comprises:

dividing a plurality of different windows from the period of time according to a set time interval and a window length, wherein a difference between starting times of adjacent windows is the time interval.

12. The device of claim 8, wherein the processor is further configured to perform:

using the Gaussian model for the joint probabilities to extract a mean value and a variance of the joint probabilities;

calculating, according to the mean value and the variance of the joint probabilities, a probability of occurrence of the joint probability corresponding to each of the windows; and detecting, according to the probability of occurrence of the joint probability corresponding to a window, whether the monitored index is abnormal.

13. The device of claim 12, wherein the processor is further configured to perform:

detecting, according to the mean value and the variance of the joint probabilities and according to the probability of occurrence of the joint probability corresponding to the window, whether the monitored index is abnormal within the window according to a $3\sigma$ rule.

14. The device of claim 8, wherein the Gaussian model comprises a Gaussian mixture model.

15. A non-transitory computer-readable storage medium having stored therein instructions that, when executed by a processor of a device, cause the device to perform:
- acquiring data of each of monitoring points, contained in a period of time, of a monitored index, wherein the monitored index corresponds to at least one of payment account theft events or payment request delay in a transaction system;
- extracting a mean value and a variance of the data of the monitoring points using a Gaussian model;
- calculating, according to the mean value and the variance of the data of the monitoring points, probabilities of occurrence of the data of the monitoring points, respectively;
- calculating, according to the respectively calculated probabilities, joint probabilities of occurrence of the data of the monitoring points contained in respective windows divided from the period of time; and
- detecting, according to the joint probabilities corresponding to the respective windows, whether the monitored index is abnormal, and outputting a detection result when the monitored index is detected to be abnormal.

* * * * *